(12) United States Patent
Francois

(10) Patent No.: US 9,630,472 B2
(45) Date of Patent: Apr. 25, 2017

(54) SYSTEM AND METHOD OF VENTILATED TRANSPORT

(75) Inventor: James M. Francois, Cedarburg, WI (US)

(73) Assignee: LSP Trucking, LLC, Jackson, WI (US)

( * ) Notice: Subject to any disclaimer, the term of this patent is extended or adjusted under 35 U.S.C. 154(b) by 1207 days.

(21) Appl. No.: 13/243,084

(22) Filed: Sep. 23, 2011

(65) Prior Publication Data
US 2013/0078075 A1 Mar. 28, 2013

(51) Int. Cl.
*B60H 1/00* (2006.01)
*B60H 1/24* (2006.01)

(52) U.S. Cl.
CPC ......... *B60H 1/00014* (2013.01); *B60H 1/243* (2013.01); *B60H 1/248* (2013.01)

(58) Field of Classification Search
CPC ....................................................... B60H 1/00
USPC ........................................................ 454/118
See application file for complete search history.

(56) References Cited

U.S. PATENT DOCUMENTS

| | | | |
|---|---|---|---|
| 1,520,504 A | | 12/1924 | Mudd |
| 2,332,034 A | | 10/1943 | West |
| 2,610,567 A | * | 9/1952 | Davis ............................ 454/118 |
| 2,734,444 A | * | 2/1956 | Lunn, Jr. et al. ............. 454/118 |
| 3,610,715 A | | 10/1971 | Bodenheimer |
| 3,699,870 A | * | 10/1972 | Cantagallo et al. .......... 454/118 |
| 3,844,203 A | * | 10/1974 | Takahashi ..................... 454/118 |
| 4,454,837 A | | 6/1984 | Luebke |
| 4,467,785 A | * | 8/1984 | Langford et al. ............. 126/400 |
| 4,481,870 A | | 11/1984 | Smith |
| 4,553,403 A | * | 11/1985 | Taylor ............................ 62/239 |
| 4,633,767 A | | 1/1987 | Sain |
| 4,704,807 A | * | 11/1987 | Ridgway ......................... 34/201 |
| 4,877,184 A | * | 10/1989 | Johnston .................. 237/12.3 C |
| 4,934,255 A | * | 6/1990 | McDonnell et al. .......... 454/174 |
| 5,240,177 A | * | 8/1993 | Muramatsu et al. ........ 236/44 C |
| 5,671,609 A | * | 9/1997 | Lionetti ........................ 62/407 |
| 5,830,057 A | * | 11/1998 | Hunt, Jr. ........................ 454/118 |
| 6,138,578 A | | 10/2000 | Cowan, Jr. et al. |
| 6,186,884 B1 | * | 2/2001 | Kelly ............................ 454/118 |

(Continued)

OTHER PUBLICATIONS

How to Prevent Mold and Mildew; 2011.

(Continued)

*Primary Examiner* — Steven B McAllister
*Assistant Examiner* — Samantha Miller
(74) *Attorney, Agent, or Firm* — Andrus Intellectual Property Law, LLP

(57) ABSTRACT

A system for the transport of goods includes a ceiling, a floor, opposed side walls, and a front wall, defining a container with an open interior. At least one fan is at most coplanar with the front wall and extends away from the front wall exterior the container. The at least one fan is oriented to direct a flow of air out of the container through the front wall. A plurality of vents are spaced along each of the opposed side walls. Operation of the at least one fan draws air into the container through the plurality of vents. A method of transporting green pallets includes providing an enclosed container. Stacks of green pallets are provided within the enclosed container. At least one fan is operated to draw a flow of air out of the interior of the enclosed container to dry the stacks of green pallets.

18 Claims, 7 Drawing Sheets

(56) References Cited

U.S. PATENT DOCUMENTS

| | | | |
|---|---|---|---|
| 6,450,133 B1* | 9/2002 | Bernard et al. | 123/2 |
| 6,470,692 B1* | 10/2002 | Ziegler et al. | 62/89 |
| 6,478,669 B1* | 11/2002 | Van | 454/118 |
| 6,543,827 B2* | 4/2003 | Miller | 296/24.35 |
| 6,581,544 B1 | 6/2003 | Smith | |
| 6,645,298 B1* | 11/2003 | Herren et al. | 118/313 |
| 6,817,316 B1 | 11/2004 | Roussy | |
| 7,585,208 B2 | 9/2009 | Rosales Vizueta | |
| 8,794,187 B2* | 8/2014 | Smith et al. | 119/401 |
| 2005/0048903 A1 | 3/2005 | McGhie | |
| 2005/0260943 A1 | 11/2005 | Snyder et al. | |
| 2006/0234620 A1 | 10/2006 | Mennen | |
| 2008/0064317 A1* | 3/2008 | Yates et al. | 454/118 |
| 2008/0110409 A1 | 5/2008 | Mennen | |
| 2008/0135341 A1* | 6/2008 | Pollard | 187/237 |
| 2008/0280361 A1* | 11/2008 | Calabotta et al. | 435/430 |
| 2009/0298409 A1 | 12/2009 | Lubker et al. | |
| 2010/0199891 A1* | 8/2010 | Miller et al. | 108/57.17 |
| 2012/0160855 A1* | 6/2012 | Waldhorn | 220/560.01 |

OTHER PUBLICATIONS

Harrison, Matthew; Mold, Fungi Still Pose Threats to Pallet Businesses; Pallet Enterprise; Date Posted: Aug. 1, 2006.
Good Handling Practices for Wood Packaging Food and Pharmaceutical Industries; 2010.
How to Avoid Moldy Pallets; May 2011.
LeBLANC, Rick; NWPCA Releases Proposed Pallet Handling Guidelines; Pallet Enterprise; Sep. 2011.
Preventing Mold 101; Mar. 2011.

* cited by examiner

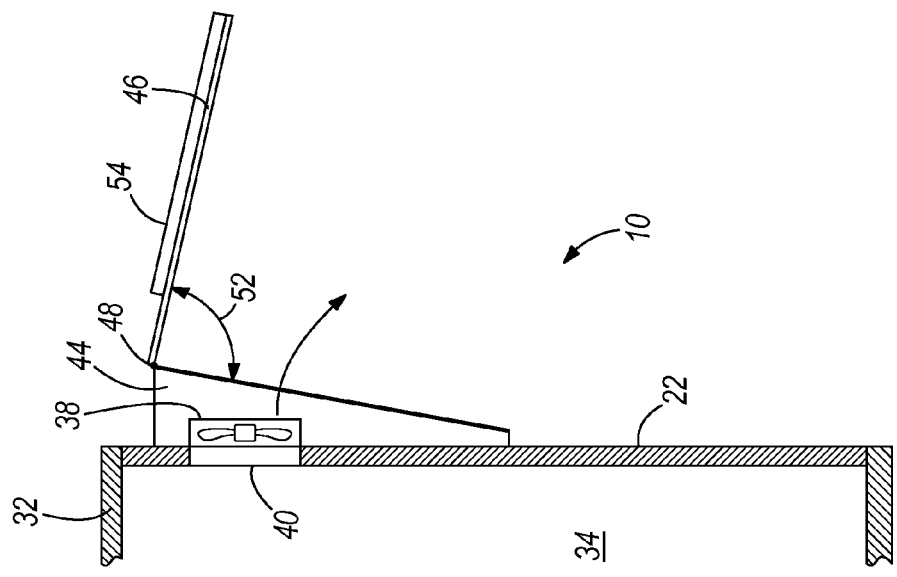
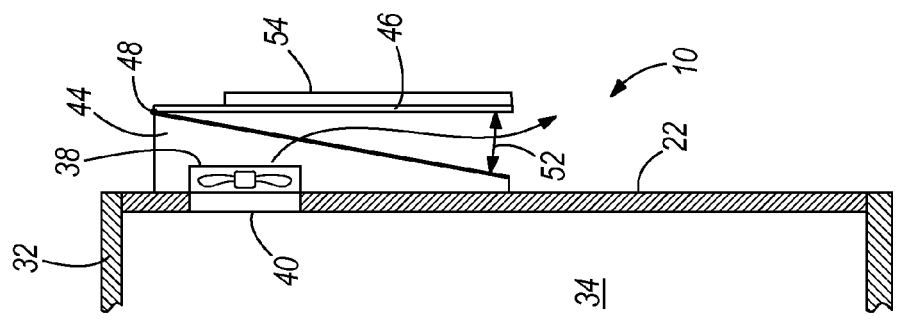
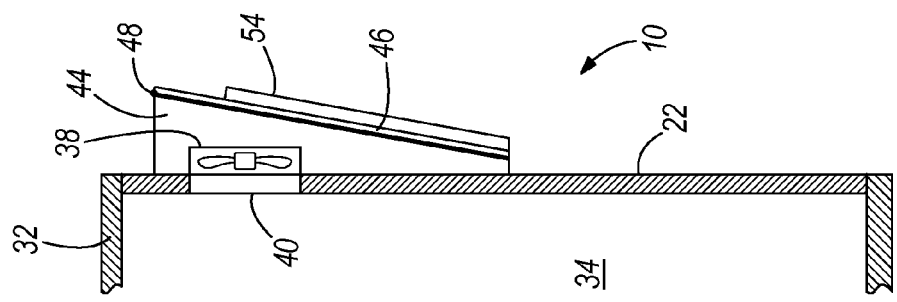

SYSTEM AND METHOD OF VENTILATED TRANSPORT

FIELD OF THE DISCLOSURE

The present disclosure relates to the field of transportation, particularly the ventilation of containers for the shipping of goods across distances.

BACKGROUND

Pallets have become a ubiquitous component of the shipping, hauling, and storing of goods. These goods include raw or bulk materials, finished industrial goods, consumer products, food, or agricultural products, among others.

One major concern with the production and sale of new pallets is the accumulation of mold, fungus, bacteria, or other microorganisms, contaminating the pallet, prior to the use of the pallet by the pallet customer for any of the aforementioned shipping needs. Pallets contaminated by mold, fungi, bacteria, or other microorganisms can possess an unpleasant odor and/or appearance, or in some cases, can spread disease or infection to workers handling the contaminated pallet or to products shipped using a contaminated pallet.

One solution that has been used is to chemically treat the newly constructed pallets. Newly constructed pallets can be treated with bleach or harsher chemicals, exemplarily tribromophenol (TBP) or copper-8-quinolinolate. However, these chemical treatments add an expensive additional step to the pallet construction process and introduces substances that are undesirable to certain pallet customers, particularly customers that ship or transport food or pharmaceuticals, or equipment used in processing fond or pharmaceuticals.

An alternative solution has been to kiln dry or "air dry" finished pallets. However, kiln drying is another expensive solution, requiring both drying equipment and the cost of energy to operate the kiln to dry the finished pallets. "Air drying" typically involves moving the finished pallets to a storage location where the pallets are dried for 2-3 weeks or more. The problems with "air drying" include issues with secondary contamination by animals such as birds or rodents that gain access to the stored pallets as the pallets dry. Additionally, the "air drying" of the pallets does not ensure that the pallets are maintained in conditions that minimize mold, fungi, or bacterial growth as the pallets are transported to the final customer.

Any of the above solutions further require that the newly constructed pallets be moved to an additional treatment location to receive the selected treatment (e.g. chemical, kiln drying, or air drying). Afterwards, the treated pallets must be moved again to the vehicle that will be used to transport the pallets to the customer. This additional moving adds further expense and time in providing a customer with new pallets.

As a final solution, new pallets can be constructed from pre-dried wood, as opposed to "green" wood that has not been dried, and therefore typically has a higher moisture content. However, pre-dried wood is more expensive and the construction of pallets with such wood does not prevent the contamination of the finished pallets during transportation.

SUMMARY

A system for the transport of wooden pallets including a ceiling, a floor, and opposed side walls. Each of the opposed side walls has a top portion secured to the ceiling and a bottom portion secured to the floor. A front wall secured to the ceiling and is secured to the floor. The front wall is also secured at respective end portions of the front wall to the opposed side walls to define a container with an open interior. The container is configured to receive stacks of green pallets in the open interior. At least one fan is disposed at most coplanar with the front wall and extends away from the front wall exterior of the container. The at least one fan is in fluid communication with the open interior of the container and is oriented such as to direct a flow of air out of the container through the front wall. A plurality of vents are spaced along each of the opposed side walls, such that operation of the at least one fan draws air into the container through the plurality of vents.

A method of transporting green pallets includes providing an enclosed container defined by a front wall, a ceiling, a floor, and opposed side walls. Stacks of green pallets are provided within the enclosed container. At least one fan that extends exterior of the enclosed container is fluidly connected to an interior of the enclosed container, and is operated to draw a flow of air out of the interior of the enclosed container. A flow of air is drawn from exterior the enclosed container into the interior of the enclosed container through a plurality of vents provided in at least the opposed side walls. The green pallets are dried with the flow of air within the interior of the enclosed container between the plurality of vents and the at least one fan.

BRIEF DESCRIPTION OF THE DRAWINGS

FIGS. 5A-C depict side views of an embodiment of the fan assembly.

DETAILED DISCLOSURE

Figure 1:
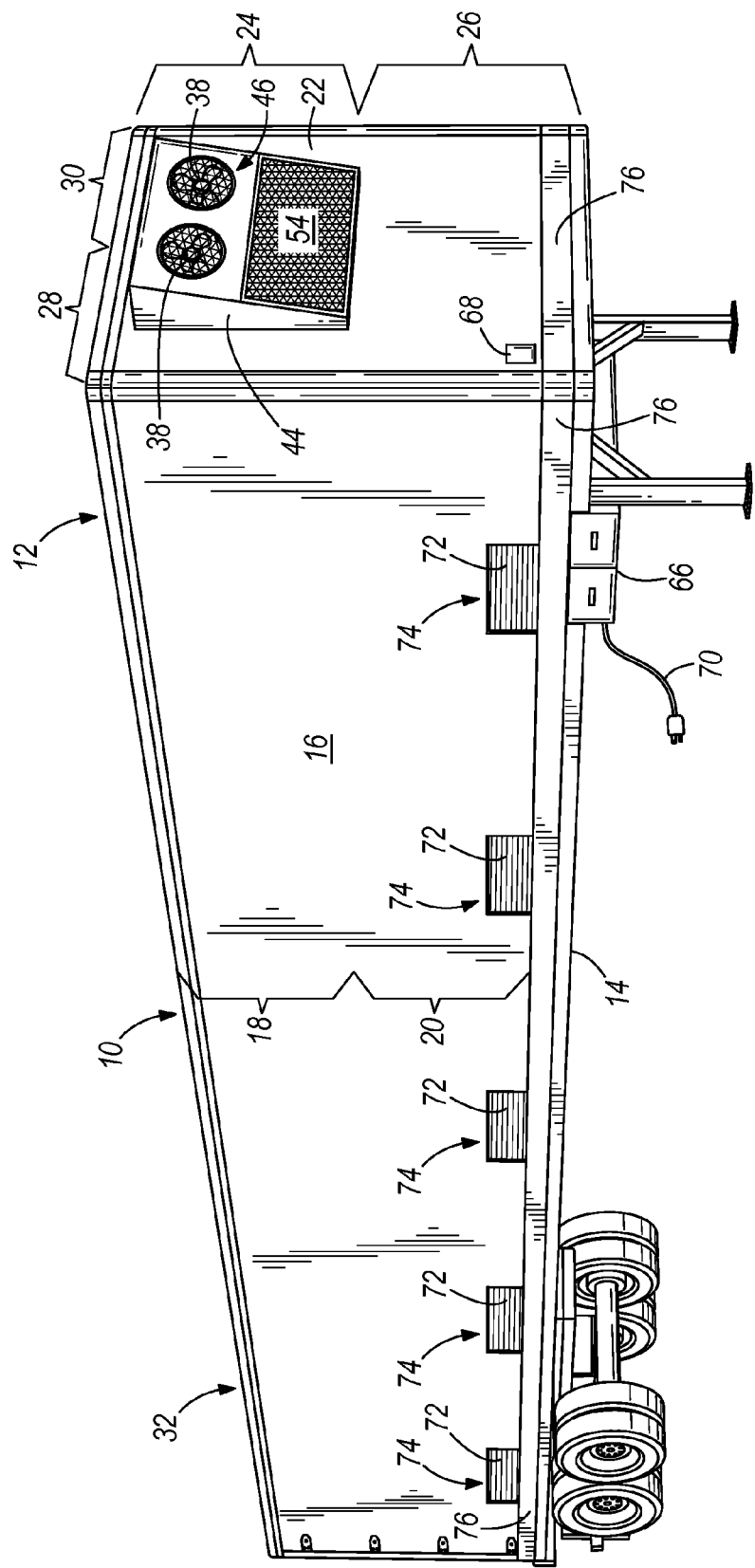
FIG. 1 is a perspective view of an embodiment of a trailer as disclosed herein.
Figure 4:
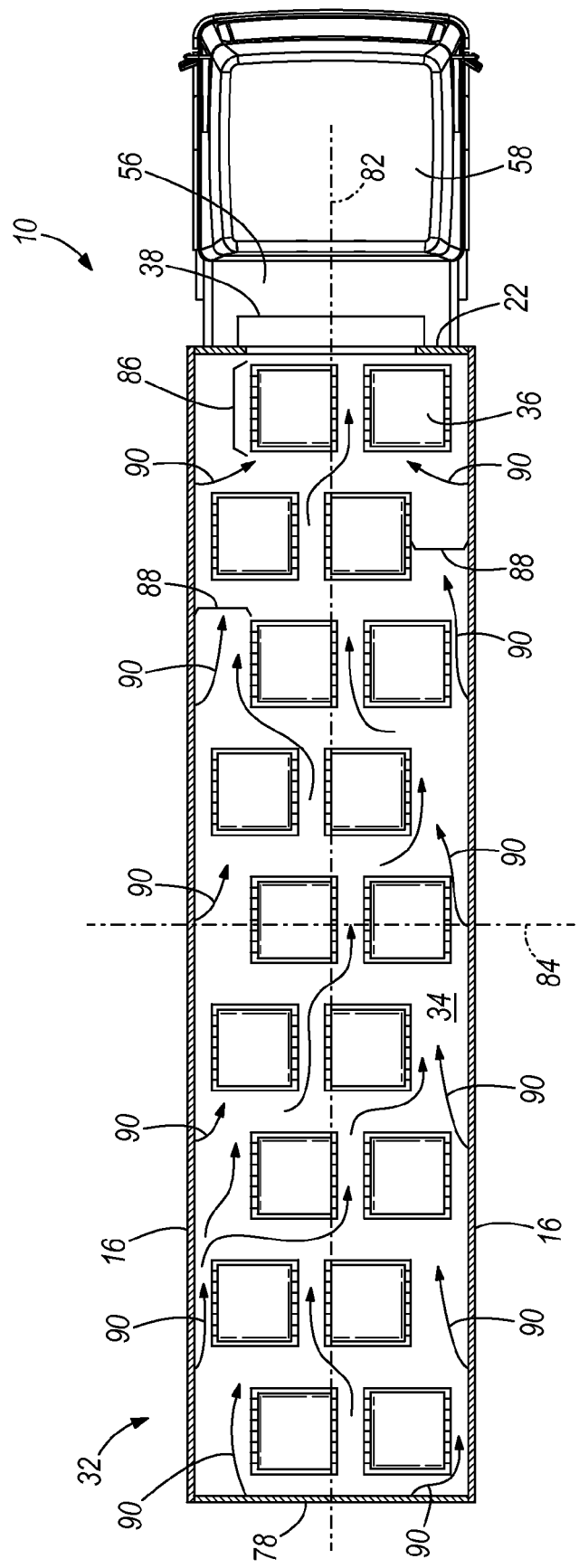
FIG. 4 is a cut away top view of an embodiment of a trailer taken along line 4-4 of FIG. 2 that depicts the arrangement of pallets therein.

FIG. 1 depicts an embodiment of a trailer 10, which is exemplarily configured to retain product therein, and to be hauled by a tractor (depicted in FIG. 4).

Figure 2:
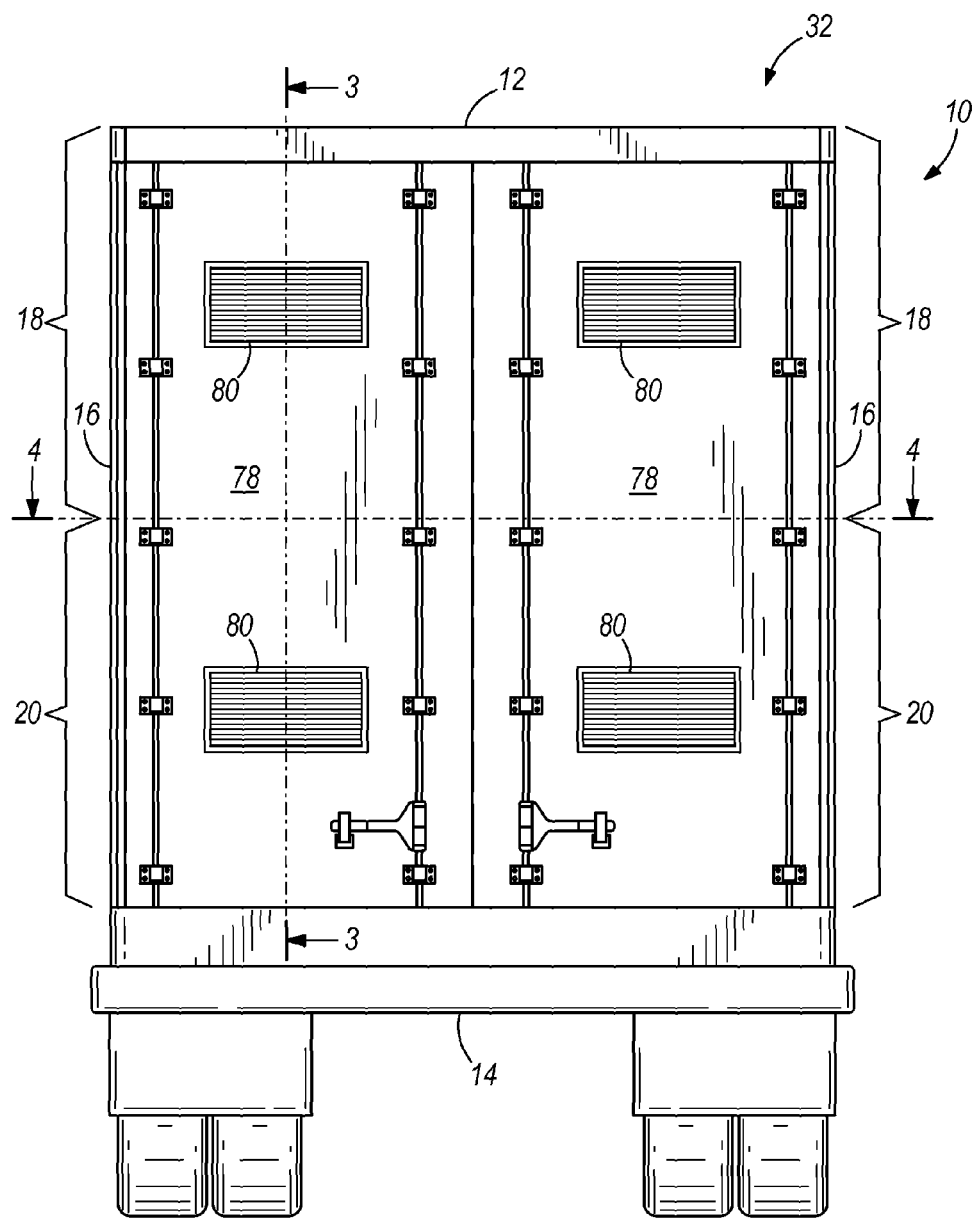
FIG. 2 is an end view of an embodiment of a trailer as disclosed herein.

The trailer 10 includes a ceiling 12, a floor 14, and side walls 16. FIG. 2 additionally depicts the trailer 10 with the ceiling 12, floor 14, and side walls 16. The side walls 16 are generally opposed as is best depicted in FIG. 2. The side walls 16 further include a top portion 18 and a bottom portion 20. Generally, the top portion 18 of the side wall 16 is an upper half of the side walls 16 and the bottom portion 20 is a lower half of the side walls 16. The ceiling 12 is secured to the top portion 18 of the side walls 16 and the floor 14 is secured to the bottom portions 20 of the side walls 16.

As depicted in FIG. 1, a front wall 22 also includes a top portion 24 and a bottom portion 26. The front wall 22 is secured at the top portion 24 to the ceiling 12 and the front wall 22 is secured at the bottom portion 26 to the floor 14. Respective opposed end portions 28, 30 of the front wall 22 are further secured to the opposed side walls 16.

Figure 3:
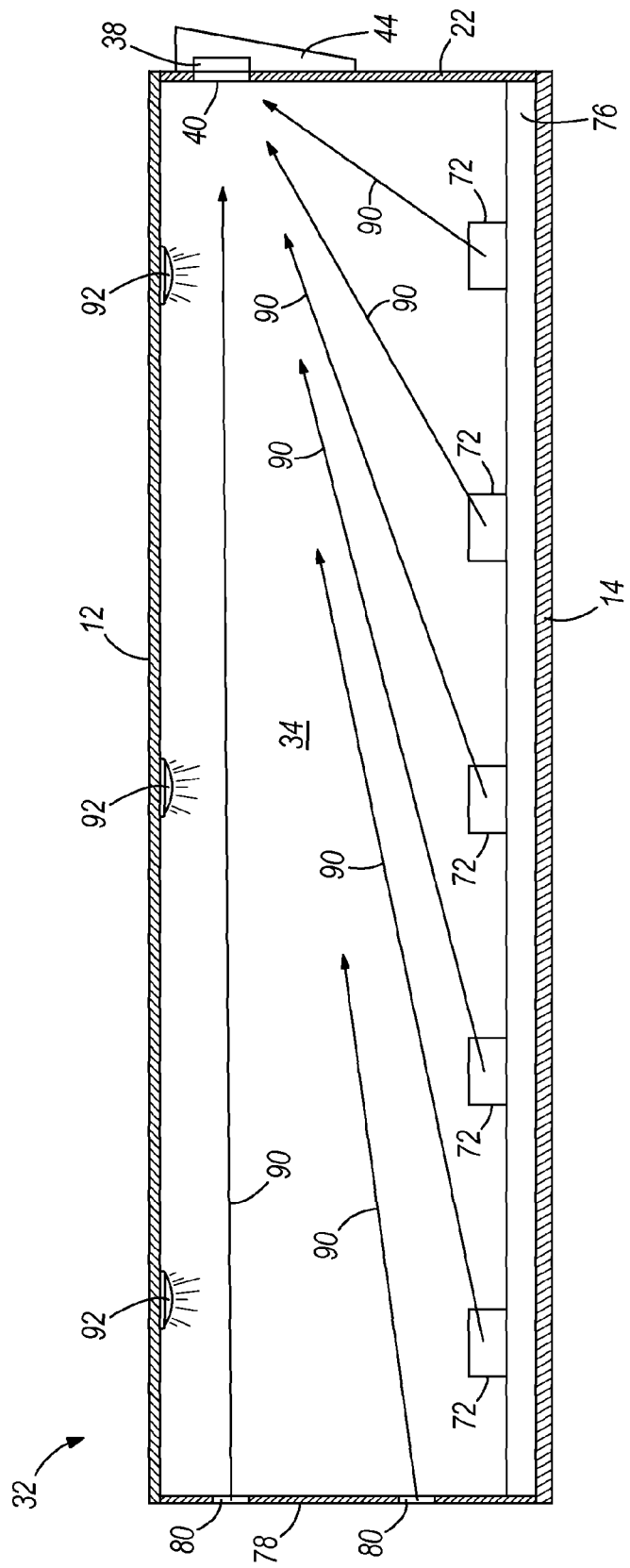
FIG. 3 is a cut away side view of an embodiment of the trailer taken along line 3-3 of FIG. 2.

As best depicted in FIGS. 3 and 4, the ceiling 12, floor 14, opposed side walls 16, and front wall 22 together define a container 32 that has an open interior 34. In embodiments, the open interior is configured to receive stacks of wooden pallets 36. In still further embodiments, the stacks of wooden pallets 36 are newly constructed wooden pallets 36 that have been constructed using "green" wood. "Green" wood refers to wood with a high moisture content, generally 30% moisture or greater. However, it will be understood that in alternative embodiments, the "green" pallets may have a moisture content less than 30%.

Referring back to FIG. 1, the trailer 10 further includes a fan 38. In the embodiment of the trailer 10 depicted in FIG. 1, two fans 38 are used; however, it is to be understood that alternative embodiments may use a single fan, or may use two or more fans within the scope of the present disclosure.

With additional reference to FIGS. 5A-C, the fan 38 is secured to the front wall 22, and is fluidly connected to the open interior 34 through a hole 40 through the front wall 22. In embodiments, the fan 38 is at most co-planar with the front wall 22 and does not extend into the open interior 34. Rather, the fan 38 extends away from the front wall 22 exterior the container 32.

As will be disclosed further herein, the fan 38 is oriented in such a manner as to direct a flow of air 42 (FIGS. 5B and 5C) out of the open interior 34 of the container 32.

The fan 38 is further surrounded by a housing 44 that at least partially surrounds and encloses the fan 38. The housing 44 provides protection for the fan 38.

FIGS. 5A-C depict cutaway views of an embodiment of the trailer 10. In the embodiments of the trailer 10 depicted in FIGS. 5A-C, the housing 44 further includes a door 46 that is pivotably connected to the housing 44 by a hinge 48. FIG. 5A depicts the door 46 in a closed position, wherein the door 46 is rotated to a minimum angle with respect to the front wall 22. In the embodiment depicted, the door is in a closed position when the door 46 is angled towards the front wall 22 from the hinge 48. In still further embodiments, the door 46 may be parallel to or angled away from the front wall 22 when the door 46 is in the closed position. In an embodiment, the door 46, when in the closed position, engages the housing 44, such as to close off the open interior 34 from the air exterior the container 32. In further embodiments, while not depicted, the door 46, or housing 44 may include a gasket 50 or other deformable component to facilitate a fluid seal between the door 46 and the housing 44.

FIG. 5B depicts the door 46 in an open configuration, wherein the open interior 34 is open to fluid communication with the air exterior the container 32 through the fan 38; however, the door 46 is in a position to impede or at minimum direct the flow of air 42 out of the open interior 34 through the fan 38. In one embodiment of the trailer 10 depicted in FIG. 5B, a wall 52 of articulate or flexible material extends between the housing 44 and the door 46 in order to further direct the flow of air 42 in a particular direction away from the fan 38. In the embodiment depicted in FIG. 5B, the flow of air 42 is directed downwards out of the fan 38 and housing 44.

FIG. 5C depicts another embodiment of the door 46 in an open configuration wherein the flow of air 42 is unimpeded to flow out of the open interior 34 through the fan 38 in the direction of arrow 42. In the embodiment of FIG. 5C, the door 46 is rotated through an angle 52 of at least 90° from the position of the door 46 in the closed position (FIG. 5A). This further opens the housing 44 to unimpeded flow of air 42 out of the open interior 34 through the fan 38.

In a still further embodiment, as disclosed herein, the door 46 may further include a solar panel 54 comprising photovoltaic cells that convert light to electrical energy, such as may be used as described herein to operate the fan 38, or other electrical components described in further detail herein of the trailer 10.

In embodiments wherein the solar panel 54 is secured to the door 46, when the door 46 is in the closed position, such as depicted in FIG. 5A, the solar panel 54 further receives protection as it is oriented vertically beneath at least a portion of the housing 44. Such a position, while also closing off the open interior 34 from the ambient conditions outside of the container 32, can provide protection to the solar panel 54 from damage that may be caused by environmental conditions, exemplarily, but not limited to, rain, snow, ice, or hail. Also, the door 46 can be rotated through angle 52 in order to orient the solar panel 54 in a position such as to maximize exposure of the solar panel 54 to light energy. In one embodiment, the angle 52 of the door 46 may be adjusted such that the solar panel 54 further receives additional light energy that is reflected off of a cap 56 of a tractor 58, depicted in FIG. 4, to which the trailer 10 is connected.

It is to be understood that while the embodiment described above locates the solar panel on the housing, alternative embodiments may include multiple solar panels and may locate those solar panels in a variety of other configurations or orientations. In one such non-limiting example, the solar panels may be located on the ceiling of the container exterior the open interior.

Figure 6:
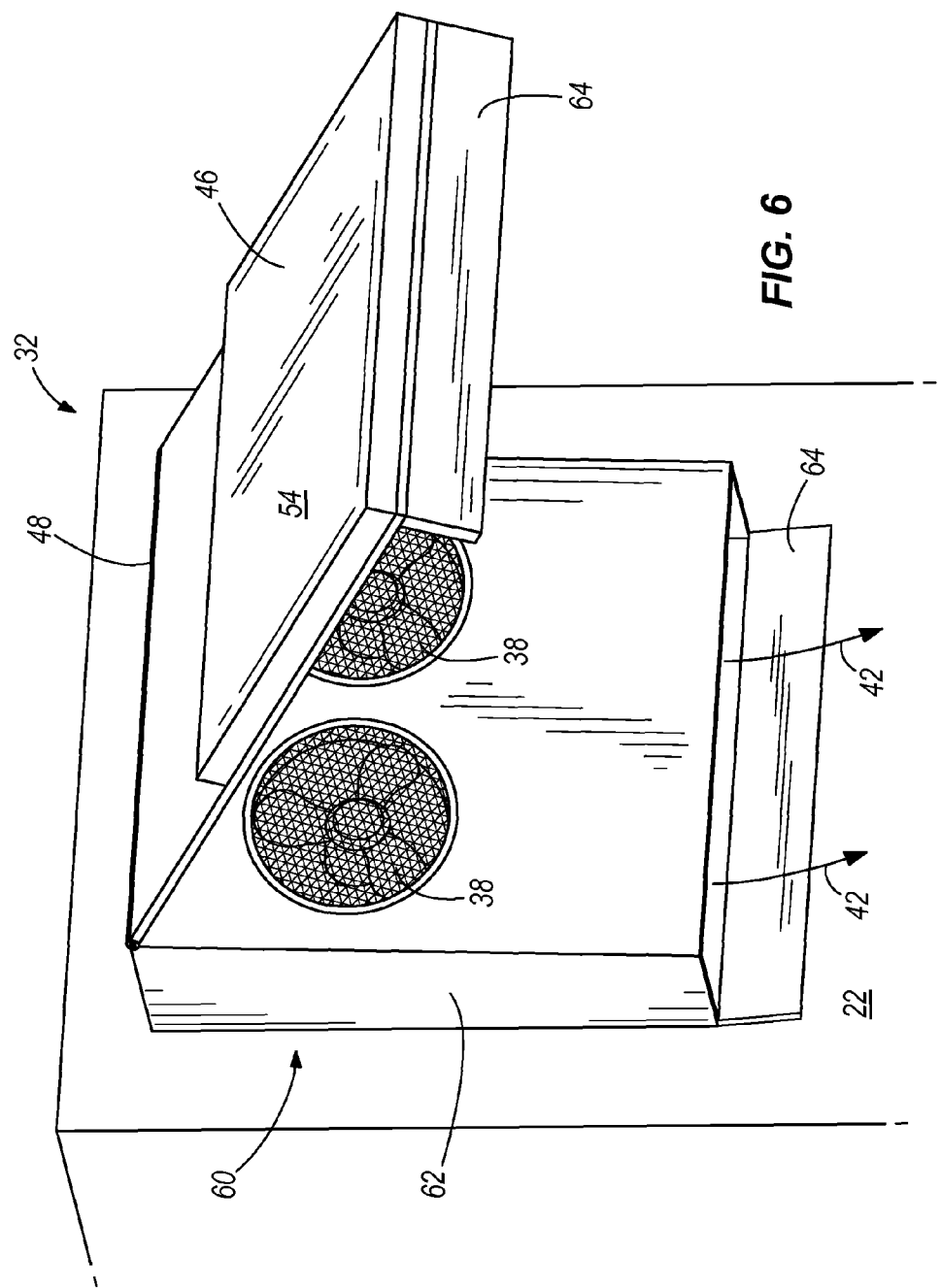
FIG. 6 depicts an alternative embodiment of the fan assembly.

FIG. 6 depicts an alternative embodiment of the fan assembly 60, as disclosed herein. The fan assembly 60 contains similar components to those as described above, with respect to that depicted in FIGS. 1 and 6A-C, although the housing 62 is constructed in a rectangular profile and the alternative embodiment of a fan assembly 60 directs the flow of air 42 out of the bottom of the housing 62, independent from the position of the door 46. The fan assembly 60 is further able to close the open interior (not depicted) of the container 32 from fluid communication with the exterior environment with one or more fan covers 64 secured to either the housing 62 or to the door 46.

Referring back to FIG. 1, the trailer 10 further includes a control box 66 that houses the electronics for operating the electrical component of the trailer, as disclosed herein. The electrical components of the trailer include the fan 38 described above. Further electrical components may include electrical servo motors (not depicted) driven to position the door 46 between an open position and a closed position. A control switch 68, which in an embodiment is expanded to a control panel with a plurality of switches or controls (not depicted), is operated by a user or technician to control the electrical components of the trailer 10, as described herein.

The control box 66 may further include in embodiments an energy storage device, exemplarily a battery, such as a rechargeable Lithium ion battery that can either be charged by connection to an external power supply, such as through a power cord 70, or can store the charge generated by the solar panel 54, when the electrical components of the trailer 10 are not in use. In a still further embodiment, the control box 66 may not include an energy storage device, and rather, the electrical components of the trailer 10 are powered simply by the connection of the control box 66 to an external power supply, exemplarily a utility power grid, an electricity generator using the power cord 70, or the alternator of a diesel engine (not depicted) of the tractor 58 (FIG. 4).

While the control box 66 is depicted in FIGS. 1 and 3 as being mounted to the container on an exterior side of the floor 14, it is to be understood that in alternative embodiments, the control box may be located in a variety of other locations. Exemplarily, the control box 66 can alternatively be mounted on the front wall 22 at a position either above or below the fan 38.

The trailer 10 further comprises a plurality of vents 72. The vents 72 are arranged on each of the side walls 16 such as to facilitate the flow of air into the open interior 34 of the container 32. In one merely exemplary embodiment, the external dimension of the trailer 10 is 53 feet in length. In such an embodiment, five evenly spaced vents 72 can be spaced approximately 9 feet apart. In one merely exemplary embodiment, each of the vents are dimensioned to maximize the flow of air into the open interior 34 disclosed in further detail herein. One such exemplary embodiment of the dimensions of the vents include vents that are 8 inches high by 12 inches wide; however, this is not intended to be limiting on the scope of the size of various alternatives of the vents as used in accordance with the present disclosure.

The vents 72 further include a mesh screen 74 that helps to prevent insects or other animals from entering into the open interior 34 through the vent 72. While not depicted, further embodiments of the vent 72 include louver or other covers that are actionable to operate the vent 72 between an open position and a closed position. In this manner, the open interior of the container 32 can further be closed off, such as when the trailer 10 is not in use for the matters as disclosed herein or to further protect the contents of the trailer 32 from weather or other external conditions.

The plurality of vents 72 are all arranged along the opposed side walls 16 in the bottom portion 20 of the side walls 16. In one more specific embodiment, the vents 72 are all arranged at the bottom of the side walls 16, where the side walls 16 are secured to the floor 14. In the case of the general construction of many containers 32, a reinforcing panel 76 wraps around the container at the lowermost portion of the side walls 16 in order to provide added strength to this portion of the container 10. The reinforcing panel 76 provides additional strength and durability to the container 32, therefore alternative embodiments of the trailer 10 locate the plurality of vents 72 still within the bottom portion 20 of the side walls 16, but above the reinforcing panel 76, which is exemplarily the bottom 6-12 inches of the side walls 16.

While the container has been described above as having five evenly spaced vents in the bottom portion of each of the side walls, it is to be understood that more or fewer vents may be located in the side walls in embodiments within the scope of the present disclosure. Additionally, one or more additional vents (not depicted) may be located in the top portion 18 of the side walls 16 or may be located at the middle of the side wall 16, such as straddling the bottom portion 20 and the top portion 18. In still further embodiments, a plurality of vents are located in various locations in the side wall 16, and only a portion of those vents are opened, with the remaining vents maintained in a closed configuration. Such an embodiment provides additional control over the flow of air through the open interior of the container, as will be disclosed in further detail herein. Such additional control can aid to refine or adjust the air flow such as to prevent localized areas that receive too much or too little ventilation.

FIG. 2 further depicts the back end of the trailer 10. The container 32 is further enclosed by a pair of doors 78 that are hingedly secured to the opposing side walls 16. While the doors 78 are depicted as being hingedly secured to the side walls 16, it is to also be understood that in alternative embodiments, the doors 78 are replaced with a single door that hinges from any of the side wall, ceiling, or floor. Alternatively, the doors 78 could be replaced by a single roll top door that rolls back and along the ceiling 12 when opening the container 32. It is to be recognized that alternative embodiments to the doors 78 are within the scope of the current disclosure.

The doors 78 depicted in FIG. 2 further include a plurality of door vents 80. The door vents 80 further arranged about the doors 78, such as maximize the flow of air into the open interior of the container 32. The vents 80 may be arranged, as depicted in FIG. 2, such that one or more of the vents 80 are located in the top portion 18 of the doors 78, while one or more of the vents 80 are located in the bottom portion 20 of the doors 78.

Referring now to FIGS. 3 and 4, the circulation of air within the open interior 34 of the container 32 will be described in further detail.

As shown in FIG. 4, the open interior 34 of the container 32 can be generally divided along a major axis 82 and a minor axis 84. The wood pallets 36 are arranged in stacks within the open interior 34. The stacks of wooden pallets 36 are arranged in stack pairs 86 that are aligned in the direction of the minor axis 84 side by side within the open interior 34. Alternating stack pairs 86 are offset from each other across the major axis 82 of the open interior 34.

In an exemplary embodiment, the dimensions of the open interior 34 of the container 32 are 96 inches across the minor axis 84 and 53 feet along the major axis 82. Continuing the exemplary embodiment, pallets arranged in stacks 36 are dimensioned 40 inches by 48 inches with the respective major and minor axes of the pallet in the same orientation as the major and minor axes of the open interior, each of the stack pairs 86 will have a gap of approximately 16 inches between the stack pairs 86 and one of the side walls 16. This gap 88 will alternate along with the staggering of adjacent stack pairs 86. Additionally, the alternating offsets of stack pairs 86 will also alternate the pallet stacks 36 extending across the major axis 82. In this manner, the flow of air, as described in further detail herein, is directed through each of the stacks of pallets 36, maximizing the exposure of all of the stacks of pallets 36 to the flow of air.

Referring now to FIG. 3, FIG. 3 includes arrows 90 that represent the flow of air into each of the vents 72 and through the open interior 34 of the container 32. Since, as described above, the vents 72 are all located in the bottom portion 20 of the side walls 16, and the fan 38 is located in the top portion 24 of the front wall 22, the air flow arrows 90 all show how the air flow is directed upwards through each of the stacks of pallets 36 as the flow of air 90 is drawn out of the container 32 by the fan 38. The additional vents 72 in the doors 78 provide further air flow through the back end of the container 32, particularly in an uppermost corner that would otherwise not receive air flow between the vents 72 in the side wall 16 and the fan 38. FIG. 4 further depicts the air flow through the open interior 34 from the top down view presented in FIG. 4.

Additionally, FIG. 3 depicts a series of light sources 92. In an embodiment, one or more light sources are arranged within the interior of the container 32. The light sources 92 produce light in a wavelength that suppresses or inhibits microbial growth. Such microbes include, but are not limited to, fungi, mold, and bacteria. In one exemplary embodiment, the light sources 92 produce ultraviolet (UV) light in a wavelength suitable to form such suppression or inhibition functions. An exemplary range of such light is known as UVC radiation that includes light with wavelengths between 250-280 nanometers. Such UVC band light can be produced with light emitting diode (LED) technology, or light bulb designed to produce such wavelengths of light. As disclosed above, the control box 66 and control switch 68 can be used to supply power to and operate the at least one light source 92 within the context of the present disclosure.

The light energy emitted from the light sources 92 further suppress or inhibits mold growth on green wooden pallets.

Figure 7:
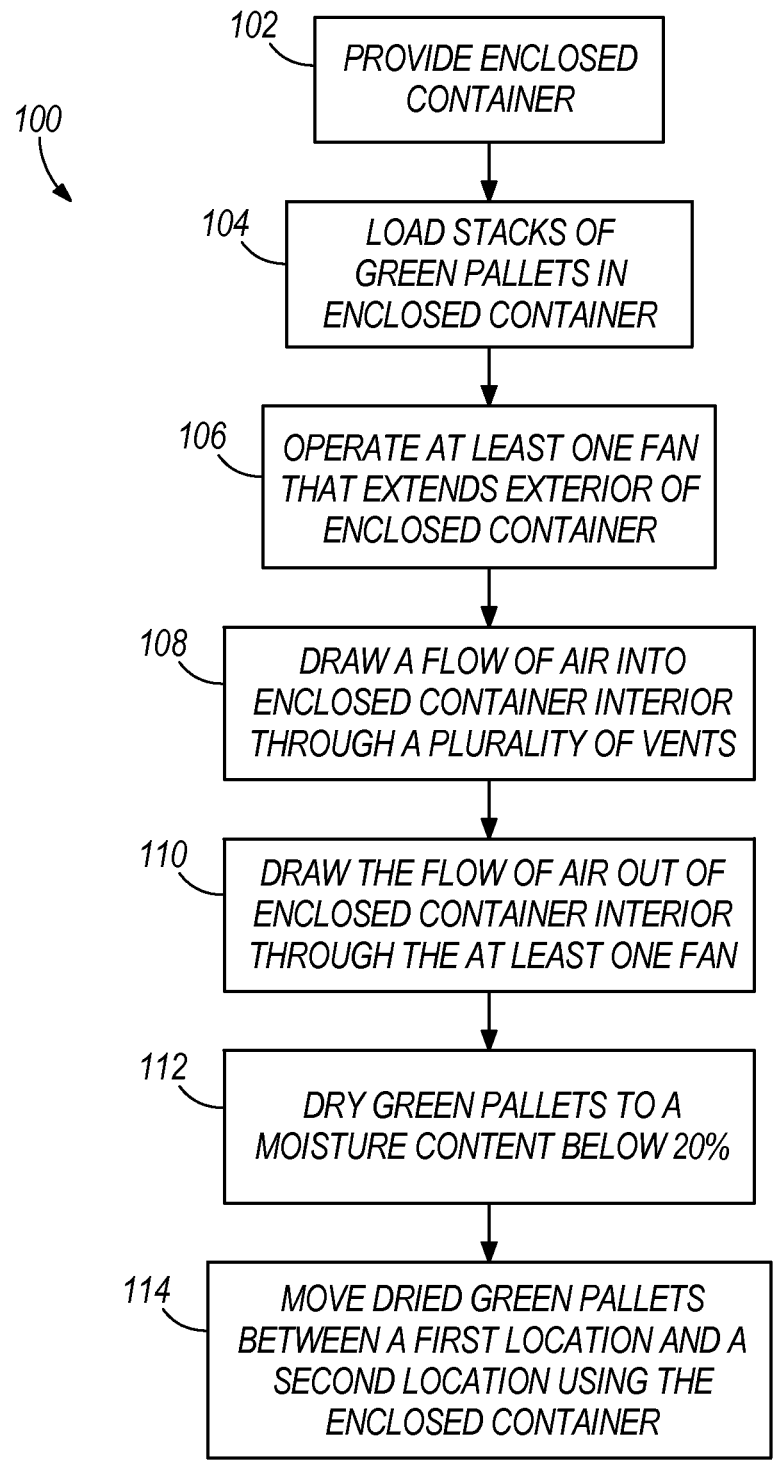
FIG. 7 is a flow chart that depicts an embodiment of a method of transporting green pallets.

FIG. 7 is a flow chart that depicts an embodiment of a method 100 of transporting a green pallet. The method 100 starts at 102 where an enclosed container is provided. The enclosed container is defined by a front wall, a ceiling, a floor, and opposed side walls. The enclosed container has a major axis that bisects the front wall and floor and a minor axis that bisects the opposed side walls and the floor. Exemplary embodiments of the container are described above with respect to FIGS. 1-6. In some embodiments, the container may be a trailer, such as configured to be pulled by a tractor while in other embodiments, the container is a shipping container configured for transfer by truck, train, or ship.

At 104, green pallets are loaded into the enclosed container. The green pallets, as described above, are pallets that generally have a moisture content above 30%, and are susceptible to mold damage. The green pallets are loaded into the enclosed container in stacks. In one embodiment, the green pallets are loaded into the closed container in pairs of stacks, wherein the stack pairs are arranged side by side in the direction of the minor axis of the container. A plurality of stack pairs are loaded into the enclosed container continuing along the major axis of the enclosed container. These stack pallets are alternatingly offset across the major axis of the enclosed container.

At 106, at least one fan located in the front wall of the container provided at 102 is operated. The at least one fan extends exterior of the enclosed container. The arrangement of the fan to extend away from the front wall in the direction exterior of the enclosed container thereby maximizes the interior space of the enclosed container to receive the stacks of green pallets and further promotes the flow of air in the manner disclosed herein.

At 108, a flow of air is drawn into the interior of the enclosed container through a plurality of vents located in at least the opposed side walls. In embodiments, the plurality of vents are specifically located in a bottom portion of the side walls, and in a still further embodiment, the vents are located at the bottom of the side walls adjacent the reinforcing panel of the side walls. In a still further embodiment, the vents are located at the bottom of the side walls, adjacent the floor of the enclosed container. In still further embodiments, the enclosed container includes one or more doors at an end of the enclosed container opposite the front wall. The one or more doors further include one or more vents. In such embodiments, a plurality of vents in the one or more doors includes at least one vent located in a bottom portion of the door and at least one vent located in a top portion of the door. The flow of air drawn into the interior of the enclosed container through the plurality of vents is generally even across the plurality of vents.

At 110, the flow of air is drawn out of the interior of the enclosed container through the at least one fan. The at least one fan operated at 106 is configured and operated in such a manner as to draw the flow of air out of the interior of the enclosed container. In embodiments, the at least one fan is located aligned on the major axis of the enclosed container and is located in a top of the front wall. In a still further embodiment, the at least one fan is located at the top of the front wall adjacent the ceiling of the enclosed container.

The flow of air drawn out of the interior of the enclosed container through the at least one fan 110 generally creates an air flow path within the interior of the enclosed container towards the at least one fan. Therefore, within the interior of the enclosed container, air flows generally in an upwards direction from each of the plurality of vents located in a bottom portion of either the opposed side walls or at least one door to the at least one fan located in a top portion of the front wall. The flow of air within the open interior of the enclosed containers is diverted by the stacks of pallets, such that the flow of air is diverted around and between the pallets stacked within the interior of the enclosed container. The generally upwards flow of air thereby promotes the flow of air directionally through all of the stacks of pallets, facilitating even exposure of the pallets within the interior of the enclosed container to the flows of air between each of the plurality of vents and the at least one fan. The alternating offset orientation of the stack pairs across the major axis of the enclosed container further discourages the shunting of the flows of air from the plurality of vents along the opposed side walls or along the major axis of the enclosed container and rather promotes the flows of air to be diverted within and through the stacks of pallets.

At 112, the green pallets stacked within the interior of the enclosed container are dried to a moisture content at or below 20%. The exposure of the green pallets to the flow of air through the interior of the enclosed container from the plurality of vents to the at least one fan remove moisture content from the green pallets such that the green pallets are dried from an initial moisture content of generally 30% or more to a moisture content at or below 20%.

Through observation, research, and experimentation, the applicant has discovered that at a moisture content at or above 30%, green pallets are susceptible to significant mold, fungi, and other microorganism growth. When the pallets have been dried to a moisture content at or below 20%, mold, fungi, and other microorganisms are inhibited from growth at the lower moisture content. Through observation, research, and experimentation, the applicant has further discovered that the constant flow of air as provided within the enclosed container between the vents and the at least one fan suppresses mold, fungi, and other microorganism growth even in the event that the green pallets are not dried to a moisture content at below 20%. Therefore, mold, fungi, and other microorganism growth is suppressed as the wooden pallets are dried, or in the event that conditions are not favorable to drying the pallets to 20% of below moisture content, pallet quality is improved with the suppression of mold, fungi, and microorganism growth.

In an embodiment wherein the enclosed containers are outside or otherwise exposed to the elements, the vents will generally draw in ambient air for circulation within the open interior. In these embodiments, the moisture content of the air drawn into the open interior through the vent is largely dependent on the environmental conditions and weather in the location of the enclosed container. Therefore, when the enclosed container is in a location and weather that includes high relative humidity, the actual moisture removal from the green pallets will be limited and when the relative humidity is low, the drying of the pallets will progress more quickly. However, as noted above, the continuous flow of air as provided within the open interior has been found to suppress mold, fungi, and microorganism growth, even in the event of high humidity and slow drying of the green pallets.

At 114, the dried green pallets are moved between a first location and second location using the enclosed container. This provides an additional advantage as the green pallets are dried in the same container in which the pallets are transported. This reduces the costs associated with handling the pallets, such that the pallets need not be moved to a first location for drying or other treatment and then moved again to a container or other transport vehicle for transporting the pallet to the customer. In still further embodiments, the drying of the pallets in the same enclosed container used to transport the pallets to the customer facilitate the protection of the pallets during the drying process from the elements, such as snow, rain, or hail.

Keeping the pallets in a single container for drying, storage, and transportation further protects the pallet from contamination or infestation by insects, small mammals, or birds as these animals can provide further sources of contamination and damage to the pallets by eating portions of the pallets, inhabiting the pallets, and defecating on the pallets. Particularly, even on dried pallets, mold, fungi, and microorganisms are known to grow on substances such as feces on the pallets from birds or mammals. Therefore, keeping the pallets secure from animals further increase the sanitation of the pallets.

In a still further embodiment, the pallets can be loaded into the enclosed container as green pallets and then dried in the manner as disclosed above as the green pallets are transported from the manufacturer to the customer. Such embodiments are particularly adapted to situations in which the customer is a suitable distance from the manufacturer, such that an adequate time for drying is achieved during the transportation process. In still further embodiments of the method 100, the pallets may be radiated with a mold or other microorganism inhibiting light, exemplarily UV light. Such UV light can be provided from one or more UV light sources mounted within the enclosed container and operated along with the at least one fan during the drying process.

In another embodiment, a solar panel may be provided on the enclosed container. The solar panel can be operated to create energization, which may be stored in an energy storage device, exemplarily a battery and used to power electrical components, such as the at least one fan and the UV light sources; however, it is understood that in alternative embodiments, other sources for energization for electrical components can be used, including, but not limited to: utility line electricity, electrical generators, or the alternator of a diesel tractor.

In embodiments, the venting of the open interior as disclosed herein further improves the comfort and/or safety of workers working in the enclosed container. Enclosed containers are known to be hot and uncomfortable in the summer and produce unpleasant working conditions for workers loading or unloading the trailer. Therefore, as a further advantage, the venting as disclosed herein improves the conditions experienced by these workers.

While the above disclosure has primarily focused on the drying and transport of wooden pallets, it is understood that alternative embodiments of the enclosed container as disclosed herein may be used for drying and shipping other goods, including, but not limited to, food or consumer products. It is further understood that some of these other products shipped using embodiments of the enclosed container as disclosed herein may themselves be loaded onto pallets for shipping with the enclosed container.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of transporting green pallets, the method comprising:
    providing an enclosed container defined by a front wall, a ceiling, a floor, and opposed side walls, each of the opposed side walls having a top portion secured to the ceiling and a bottom portion secured to the floor, the front wall secured at a top portion to the ceiling, secured at a bottom portion to the floor, and secured at end portions respectively to the opposed side walls to define the enclosed container with an interior, the container being configured to receive green pallets for transport in the interior, and the enclosed container comprising at least one fan extending away from the front wall exterior of the enclosed container;
    providing stacks of green pallets within the interior of the enclosed container;
    operating the at least one fan, the at least one fan in fluid communication with the interior of the enclosed container, to draw a flow of air out of the interior of the enclosed container;
    drawing a flow of ambient air with the at least one fan from exterior the enclosed container into the interior of the enclosed container through a plurality of vents provided in at least the opposed side walls;
    directing the flow of ambient air upwards through the stacks of green pallets from the vents to the at least one fan;
    drying the green pallets to a moisture content below 20% with the flow of air within the interior of the enclosed container between the plurality of vents and the at least one fan; and
    moving the green pallets between a first location and a second location using the enclosed container.

2. The method of claim 1, the enclosed container comprising a major axis that bisects the front wall and the floor and a minor axis that bisects the opposed side walls and the floor, further comprising:
    arranging the stacks of green pallets within the enclosed container in a plurality of stack pairs, each of the stack pairs of the plurality comprising a first stack of pallets adjacent a second stack of pallets, the first and second stacks of pallets aligned parallel to the minor axis;
    arranging the stack pairs within the enclosed container wherein adjacent stack pairs along the major axis are offset from one another across the major axis.

3. The method of claim 2, wherein the arrangement of the stacks of green pallets maximizes the exposure of the green pallets to the flow of air.

4. The method of claim 3, further comprising irradiating the green pallets with a mold-inhibiting wavelength of light produced by a light source within the enclosed container.

5. The method of claim 4, further comprising:
    generating electrical energization from a solar array secured to an exterior of the enclosed container;
    storing the generated electrical energization with a battery secured to the enclosed container; and
    powering at least the at least one fan and the light source from the battery.

6. The method of claim 1, wherein the at least one fan is located proximal to the top portion of the front wall, and the plurality of vents are located proximal to the respective bottom portions of the opposed side walls.

7. The method of claim 6, wherein the at least one fan is located at the top portion of the front wall, adjacent to the ceiling, and the plurality of vents are located at the respective bottom portions of the opposed side walls adjacent to the bottom panel.

8. The method of claim 1, further comprising a door hingedly connected to the container at a rear end opposed to the front wall, the door further comprising at least one vent.

9. The method of claim 1, wherein the door comprises at least a first pair of vents located proximal to the floor and a second pair of vents located proximal to the ceiling.

10. The method of claim 1, further comprising a mesh screen disposed within the container across each of the vents.

11. The method of claim 1, further comprising at least one light source within the container, the at least one light source produces light of a wavelength that suppresses or inhibits microbial growth.

12. The method of claim 11, wherein the at least one light source produces ultraviolet wavelength light.

13. The method of claim 1, further comprising a solar panel secured to an exterior of the container, the solar panel generates energy used to charge a battery, the battery being a power source used by the at least one fan to operate the at least one fan.

14. The method of claim 13, further comprising:
a housing secured to the front wall exterior the container, the housing surrounding the at least one fan and comprising an opening through which the at least one fan directs the flow of air out of the container; and
a door is hingedly connected to the housing such that the door is adjustable through at least 90 degrees of angle with respect to the front wall between an open configuration wherein the door has rotated about a maximum angle with respect to the front wall and a closed configuration wherein the door is rotated a minimum angle with respect to the front wall.

15. The method of claim 14, wherein when the door is in the closed configuration, the door closes the opening of the housing to prevent airflow therethrough.

16. The method of claim 1, wherein the plurality of vents are selectively operable between open and closed positions to control the flow of air within the open interior between the plurality of open vents and the at least one fan.

17. The method of claim 1, wherein the container is a trailer configured to be pulled by a tractor.

18. A method of transporting green pallets, the method comprising:
providing an enclosed container defined by a front wall, a ceiling, a floor, and opposed side walls, each of the opposed side walls having a top portion secured to the ceiling and a bottom portion secured to the floor, the front wall secured at a top portion to the ceiling, secured at a bottom portion to the floor, and secured at end portions respectively to the opposed side walls to define the enclosed container with an interior, the enclosed container comprising a major axis that bisects the front wall and the floor and a minor axis that bisects the opposed side walls and the floor, the container being configured to receive green pallets for transport in the interior, and the enclosed container comprising at least one fan in the top portion of the front wall of the enclosed container;
arranging the stacks of green pallets within the interior of the enclosed trailer in a plurality of stack pairs, each of the stack pairs of the plurality comprising a first stack of pallets adjacent a second stack of pallets, the first and second stacks of pallets aligned parallel to the minor axis;
arranging the stack pairs within the enclosed trailer wherein adjacent stack pairs along the major axis are offset from one another across the major axis;
operating the at least one fan, the at least one fan in fluid communication with the interior of the enclosed container, to draw a flow of air out of the interior of the enclosed container;
drawing a flow of air with the at least one fan from exterior the enclosed container into the interior of the enclosed container through a plurality of vents provided in the bottom portions of the opposed side walls;
directing the flow of ambient air upwards through the stacks of green pallets from the plurality of vents in the bottom portions of the opposed side walls to the at least one fan in the top portion of the front wall;
drying the green pallets to a moisture content below 20% with the flow of air within the interior of the enclosed container between the plurality of vents and the at least one fan; and
moving the green pallets between a first location and a second location using the enclosed container.

* * * * *